United States Patent
Cosman

(10) Patent No.: US 7,067,612 B2
(45) Date of Patent: Jun. 27, 2006

(54) PREFORMED COMPOSITIONS IN SHAPED FORM

(75) Inventor: Michael A. Cosman, Valencia, CA (US)

(73) Assignee: PRC-Desoto International, Inc., Glendale, CA (US)

( * ) Notice: Subject to any disclaimer, the term of this patent is extended or adjusted under 35 U.S.C. 154(b) by 0 days.

(21) Appl. No.: 10/355,813

(22) Filed: Jan. 30, 2003

(65) Prior Publication Data

US 2004/0152866 A1  Aug. 5, 2004

(51) Int. Cl.
  *C08G 75/00*  (2006.01)

(52) U.S. Cl. .................. 528/373; 528/374; 528/378; 525/263; 525/261; 525/328.5; 525/330.9; 525/535

(58) Field of Classification Search ............... 528/373, 528/374, 378; 525/263, 261, 328.5, 330.9, 525/535
See application file for complete search history.

(56) References Cited

U.S. PATENT DOCUMENTS

| | | | |
|---|---|---|---|
| 2,450,940 A | 10/1948 | Cowan et al. | |
| 2,466,963 A * | 4/1949 | Patrick et al. | 528/387 |
| 3,499,863 A | 3/1970 | Kulch | |
| 3,659,896 A * | 5/1972 | Smith et al. | 296/93 |
| 4,366,307 A | 12/1982 | Singh et al. | |
| 4,689,395 A | 8/1987 | Bergmann et al. | |
| 6,372,849 B1 | 4/2002 | DeMoss et al. | |
| 6,461,458 B1 | 10/2002 | Fisher et al. | |
| 6,485,806 B1 * | 11/2002 | Tateyama et al. | 428/36.9 |
| 6,486,297 B1 * | 11/2002 | Zook et al. | 528/373 |

FOREIGN PATENT DOCUMENTS

JP  02227476  *  9/1990
JP  09235463  *  3/1996

OTHER PUBLICATIONS

*Encyclopedia of Chemical Technology*, (Kirk-Othmer), vol. 13, John Wiley & Sons, 1967, pp. 398-424.

Fettes et al., "Polysulfide Polymers," *Industrial and Engineering Chemistry*, vol. 42, No. 11, Nov. 1950, pp. 2217-2223.

* cited by examiner

*Primary Examiner*—Duc Truong
(74) *Attorney, Agent, or Firm*—Diane R. Meyers

(57) ABSTRACT

Preformed compositions comprising sulfur-containing polymers in shaped form and the use of preformed compositions in shaped form to seal apertures. In certain embodiments, the preformed compositions comprise a sulfur-containing polymer and a blend of fillers wherein the blend comprises substantially equal amounts of mica and polyamide.

36 Claims, No Drawings

PREFORMED COMPOSITIONS IN SHAPED FORM

FIELD OF THE INVENTION

The present invention relates to preformed compositions in shaped form and the use of preformed compositions for sealing apertures.

BACKGROUND OF THE INVENTION

Polysulfide polymers are known in the art. The production of polysulfide polymers is characterized by Fettes and Jorczak, Industrial and Engineering Chemistry, November 1950, on pages 2,217–2,223. The commercial use of polysulfide polymers in the manufacture of sealants for aerospace applications has long been known and commercially used. Polysulfide sealants have been used to seal aircraft exterior fuselage because of the high tensile strength, high tear strength, thermal resistance and resistance to high ultraviolet light. Polysulfide sealants have been used to seal aircraft fuel tanks because of the resistance to fuel and adhesion upon exposure to fuel.

Polysulfide sealants are generally applied by extrusion using a caulking gun. Such a process may be efficient for permanent panels installed on the aircraft fuselage. However, extruding a sealant to seal apertures in the fuselage of an aircraft such as those associated with access doors can require a significant amount of additional effort than for extruding the same sealant to permanent panels. To extrude a sealant, the interior perimeter of the access door opening is masked and the exterior perimeter of the access door is coated with a release agent prior to extruding the sealant to the masked area of the access door opening to avoid sealing an access door shut. The access door is put in place and clamped down to force the excess sealant around the access door. The sealant is allowed to cure and the excess sealant is trimmed away. This process is time intensive and can add significant labor to servicing aircraft with many access doors. Some aircraft can have as many as a hundred or more access doors that are used to cover sensitive equipment or fittings that must be periodically accessed.

Accordingly, it is desirable to provide a method for sealing access doors, for example those in the fuselage of an aircraft, that does not require masking, reduces trimming and/or is not as labor and time intensive as the conventional extrusion method for sealing the access doors.

SUMMARY OF THE INVENTION

In accordance with embodiments of the invention, a preformed composition for sealing apertures comprises a sulfur-containing polymer in shaped form.

In accordance with embodiments of the invention, a method for sealing an aperture comprises (a) applying a preformed composition comprising a sulfur-containing polymer in tape form to cover the aperture, and (b) curing the composition while in place covering the aperture so as to seal the aperture.

In accordance with embodiments of the invention, a composition comprises (a) a sulfur-containing polymer, and (b) a blend of fillers, wherein the blend comprises substantially equal amounts by weight of mica and polyamide.

DETAILED DESCRIPTION OF THE EMBODIMENTS

In certain embodiments of the invention, a preformed composition suitable for sealing apertures, for example, elongated apertures in the fuselage of an aircraft, comprises a sulfur-containing polymer in shaped form. The term "preformed" refers to a composition that can be prepared into a particular shape for ease of packaging, storage, and/or application. A composition that is preformed can be reshaped into any shape either intentionally or as a result of shipping and/or handling. The term "shaped form" refers to a configuration such that the thickness of the preformed composition is substantially less than the lateral dimension and includes tapes, sheets and cut-out or gasket forms. The "shaped form" can be in the form of a tape meaning a narrow shape, strip, or band that can be stored as rolls, coils, or strips. The "shaped form" can also be die-cut to the dimensions of the aperture to be sealed.

The term "sealant," "sealing," or "seal" refers to compositions that have the ability to resist atmospheric conditions such as moisture and temperature and at least partially block the transmission of materials such as water, fuel, and other liquids and gasses. Sealants often have adhesive properties, but are not simply adhesives that do not have the blocking properties of a sealant. The term "elongated aperture" refers to an opening in which the length is at least three-times the width.

In certain embodiments, the sulfur-containing polymers useful in the practice of the invention are polysulfide polymers that contain multiple sulfide groups, i.e., —S—, in the polymer backbone and/or in the terminal or pendent positions on the polymer chain. Such polymers are described in U.S. Pat. No. 2,466,963 wherein the disclosed polymers have multiple —S—S— linkages in the polymer backbone. Other useful polysulfide polymers are those in which the polysulfide linkage is replaced with a polythioether linkage, i.e.,

where n is from 8 to 200 as described in U.S. Pat. No. 4,366,307. The polysulfide polymers can be terminated with non-reactive groups such as alkyl, although preferably the polysulfide polymers contain reactive groups in the terminal or pendent positions. Typical reactive groups are thiol, hydroxyl, amino, and vinyl. Such polysulfide polymers are described in the aforementioned U.S. Pat. No. 2,466,963, U.S. Pat. No. 4,366,307, and U.S. Pat. No. 6,372,849. Such polysulfide polymers can be cured with curing agents that are reactive with the reactive groups of the polysulfide polymer. In certain embodiments, two-component curable compositions are preferred to the one-component curable compositions because the two-component compositions provide the best rheology for application and exhibit desirable physical and chemical properties in the resultant cured composition. As used herein the two components are referred to as the base composition and the curing agent composition. In certain embodiments the base composition comprises polysulfide polymers, oxidizing agents, additives, fillers, plasticizers, organic solvents and combinations thereof. In certain embodiments the curing agent composition comprises curing agents, plasticizers, additives, fillers and combinations thereof.

The sulfur-containing polymers of the invention typically have number average molecular weights ranging from 500 to 8,000 Daltons, and more typically from 1,000 to 4,000

Daltons, as determined by gel permeation chromatography using a polystyrene standard. For sulfur-containing polymers that contain reactive functional groups, the sulfur-containing polymers have average functionalities ranging from 2.05 to 3.0 and more typically from 2.1 to 2.6. A specific average functionality can be achieved by suitable selection of reactive ingredients. Examples of suitable sulfur-containing polymers are those available from PRC-DeSoto International, Inc. under the trademark PERMAPOL®, specifically, PERMAPOL P-3.1E® or PERMAPOLP-3®.

In certain embodiments, the preformed composition of the present invention comprises a curing agent for the sulfur-containing polymer. In other embodiments, the curing agent is reactive at 10° C. to 80° C. The term "reactive" means capable of chemical reaction and includes any level of reaction from partial to complete reaction of a reactant. In certain embodiments, a curing agent is reactive when it provides for cross-linking or gelling of a sulfur-containing polymer.

In certain embodiments, the preformed composition comprises a curing agent that contains oxidizing agents that oxidize terminal mercaptan groups of the sulfur-containing polymer to form disulfide bonds. Useful curing agents include lead dioxide, manganese dioxide, calcium dioxide, sodium perborate monohydrate, calcium peroxide, zinc peroxide, and dichromate. The term "curing agent" refers to any material that can be added to a sulfur-containing polymer to accelerate the curing or gelling of the sulfur-containing polymer. Curing agents are also known as accelerators, catalysts or cure pastes.

In certain embodiments, preformed compositions of the present invention comprise one or more curing agents that contain reactive functional groups that are reactive with the functional groups attached to the sulfur-containing polymer. Useful curing agents include polythiols, such as polythioethers, for curing vinyl-terminated polymers; polyisocyanates such as isophorone diisocyanate, hexamethylene diisocyanate, and mixtures and isocyanurate derivatives thereof for curing thiol-, hydroxyl- and amino-terminated polymers; and, polyepoxides for curing amine- and thiol-terminated polymers. Examples of polyepoxides include hydantoin diepoxide, Bisphenol-A epoxides, Bisphenol-F epoxides, Novolac-type epoxides, aliphatic polyepoxides, and epoxidized unsaturated and phenolic resins. The term "polypepoxide" refers to a material having a 1,2-epoxy equivalent greater than one and includes monomers, oligomers, and polymers.

In certain embodiments, preformed compositions of the present invention comprise additives. The term "additive" refers to a non-reactive component in the preformed composition that provides a desired property. Examples of additives include micas and polyamides. Mica is a silicate characterized by basal cleavage that imparts flexibility to laminas. Micas include natural muscovite, phlogopite, and biotite, as well as synthetic fluorophlogopite and barium disilicic. Preparation of synthetic micas is described in Encyclopedia of Chemical Technology, Vol. 13, pp. 398–424, John Wiley & Sons (1967). Mica provides flexibility and pliability to the preformed composition and reduces the tack. Polyamide powder provides viscosity and reduces the tack of the preformed composition. Polyamide resins can be produced by the condensation reaction of dimerized fatty acids, such as dimerized linoleic acid, with lower aliphatic polyamines, such as for example, ethylene diamine or diethylene triamine, so that the final product has multiple amide groups in the resin backbone. A process for the manufacture of polyamide resins is disclosed in U.S. Pat. No. 2,450,940. Polyamide resins suitable for the preformed composition are solid at use temperature and typically have a number average molecular weight of at least 10,000 Daltons.

Other additives useful in the preformed compositions of the present invention include those commonly used in the art, such as carbon black and calcium carbonate. Other additives include fumed silica, microspheres, titanium dioxide, chalks, alkaline blacks, cellulose, zinc sulfide, heavy spar, alkaline earth oxides, and alkaline earth hydroxides. Additives also include high band gap materials such as zinc sulfide and inorganic barium compounds. Other additives include plasticizers. Plasticizers that are useful include phthalate esters, chlorinated paraffins, and hydrogenated terphenyls.

In certain embodiments the preformed composition further comprises an organic solvent, such as a ketone or an alcohol, for example methyl ethyl ketone and isopropyl alcohol, or a combination thereof.

In certain embodiments, mica and polyamide together form 10% by weight to 50% by weight of the total weight of the preformed composition with substantially equal amounts of mica and polyamide. Substantially equal means that the amount of mica and the amount of polyamide are present in an amount of less than 5% of each other. Amounts greater than 50% by weight can be difficult to mix. The amount of mica can range from 5% by weight to 25% by weight and the amount of polyamide from 5% by weight to 25% by weight. In one embodiment, the amount of mica ranges from 10% by weight to 20% by weight and the amount of polyamide ranges from 10% by weight to 20% by weight of the total weight of the preformed composition. Adding only mica or only polyamide impacts the rheology of the uncured preformed composition, but generally does not change the properties of the preformed composition when cured such as tensile elongation, compression, fuel resistance and thermal resistance.

In certain embodiments, the base composition and curing agent composition are proportioned to 100 parts by weight of base composition and 2 to 12 parts by weight of curing agent composition. In general, the equivalent ratio of curing agent to sulfur-containing polymer should range from 0.5:1 to 2.0:1

In certain embodiments, additives other than mica and polyamide comprise up to 30% by weight of the total weight of the preformed composition.

In certain embodiments, the preformed compositions of the present invention are prepared as separate components referred to as the base composition and the curing agent composition prior to mixing and application.

In certain embodiments, a base composition can be prepared by batch mixing a sulfur-containing polymer, mica, polyamide, and other additives in a double planetary mixer under vacuum. Other suitable mixing equipment include a kneader extruder, sigma mixer, or double "A" arm mixer. For example, a sulfur-containing polymer, 2-mercaptoethanol, and a plasticizer are charged to the double planetary mixer and mixed under vacuum for 6 to 8 minutes. Silica is then mixed until cut in followed by the addition of titanium dioxide that is mixed until cut in. Calcium carbonate is then charged and mixed until cut in, followed by the addition of mica that is mixed until cut in. Polyamide is then charged and mixed until cut in, and the mixture is then mixed for 3 to 15 minutes under vacuum. Microspheres are then charged and mixed until cut in. The mixture is then mixed for an additional 15 to 20 minutes under a vacuum of 27 inches of mercury or greater. In-process testing is performed and if the mixture is too tacky, equal amounts of mica and polyamide powder are added and mixed under vacuum to reduce tack. The base composition is then extruded from the mixer using a high pressure piston ram.

The curing agent composition can be prepared by batch mixing the curing agent and other additives. In certain embodiments 75% of the total plasticizer such as partially hydrogenated terphenyl and an accelerant such as a dipentamethylene/thiuram/polysulfide mixture are mixed in a single-shaft anchor mixer. Molecular sieve powder is then added and mixed for 2 to 3 minutes. Fifty percent of the total manganese dioxide is then mixed until cut in. Stearic acid, sodium stearate, and the remaining plasticizer are then mixed until cut in followed by the remaining 50% of the manganese dioxide which is mixed until cut in. Silica is then mixed until cut in. If the mixture is too thick a surfactant may be added to increase wetting. The curing agent composition is then mixed for 2 to 3 minutes, passed over a three-roll paint mill to achieve a grind, and returned to the single-shaft anchor mixer and mixed for an additional 5 to 10 minutes. The curing agent composition is then removed from the mixer with a piston ram and placed into storage containers and aged for at least 5 days prior to combining with the base composition.

The base composition and curing agent composition are mixed together to form the preformed composition. The base composition and curing agent composition are combined in the desired ratio using meter mix equipment fitted with a dynamic mix head. Pressure from the meter mix equipment forces the base and curing agent compositions through the dynamic mix head and an extrusion die. In certain embodiments the preformed composition is extruded into a laminar form including a tape or sheet. The preformed composition in sheet form can be cut to any desired shape such as defined by the dimensions of an aperture to be sealed. In certain embodiments, the shaped form can be coiled with release paper separating each ring for packaging purposes. The shaped form is then refrigerated by placing the shaped form on a bed of dry ice and placing another layer of dry ice on the top of the shaped form. The shaped form is refrigerated immediately after mixing the base composition and the curing agent composition. The shaped form remains exposed to the dry ice for 5 to 15 minutes and is then placed at a storage temperature of −40° C. or lower. The term "refrigerated" refers to reducing the temperature of the preformed composition so as to retard and/or stop the curing of the preformed composition. Typically, the preformed composition in shaped form is refrigerated below −40° C.

In certain embodiments, the temperature of the preformed composition is raised to a use temperature ranging from 4° C. to 32° C. (40° F. to 90° F.) prior to application. This is done such that the preformed composition reaches use temperature for no more than 10 minutes prior to application.

In certain embodiments the preformed composition in shaped form can be used to seal an aperture between a removable access panel and the surface adjacent to the perimeter of an opening in an aircraft fuselage. Adhesion promoter is first brushed on the perimeter of the access panel opening after the surface has been cleaned with a cleaning solvent such as Desoclean®. The surface of the access panel is then cleaned and coated with a release agent prior to applying the preformed composition. The preformed composition in shaped form is manually applied to the surface adjacent to the perimeter of the access panel opening, to the surface adjacent to the perimeter of the access panel, or to both. The access panel is then put in place and clamped down forcing the excess preformed composition around the edges of the access panel. Excess preformed composition is easily removed by using, for example, a flat surface. Excess preformed composition can be removed either prior to curing or after the preformed composition has cured, and preferably after the preformed composition cures.

The integrity, moisture resistance and fuel resistance of the seal resulting from application of preformed compositions of the present invention can be evaluated by performing the tests identified in specification MMS 332. An acceptable seal will be tight and resistant to moisture and aircraft fuel.

It is noted that, as used in this specification and the appended claims, the singular forms "a," "an," and, "the" include plural referents unless expressly and unequivocally limited to one referent. Thus, for example, reference to "a filler" includes two or more fillers. Also it is noted that, as used herein, the term "polymer" is meant to refer to polymers, oligomers, homopolymers, and copolymers.

For the purposes of this specification and appended claims, unless otherwise indicated, all numbers expressing quantities of ingredients or percentages or proportions of other materials, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "10 to 50" includes any and all sub-ranges between (and including) the minimum value of 10 and the maximum value of 50, that is, any and all sub-ranges having a minimum value of equal to or greater than 10 and a maximum value of equal to or less than 50, e.g., 25 to 50.

The following examples illustrate certain embodiments of the present invention.

EXAMPLE 1

In Example 1, the following materials were mixed in the proportions according to Table I to form the base composition: Thioplast® polysulfide polymer from Akzo-Nobel, 2-mercaptoethanol from BASF, Terminol® partially hydrogenated terphenyl plasticizer from Solutia, phenolic resin from PRC-DeSoto International, Inc., Cab-O-Sil® fumed silica from Cabot Corporation, titanium dioxide, Socal® or Winnofil® precipitated calcium carbonate from Solvay, mica from ACME-Hardesty Company, Orgasol® polyamide powder from Atofina, and Expancel® microspheres from Akzo-Nobel.

TABLE I

Base Composition

| | Weight Percent |
|---|---|
| Polysulfide Polymer | 36.56 |
| 2-mercaptoethanol | 0.10 |
| Partially Hydrogentated Terphenyl | 6.28 |
| Phenolic Resin | 1.05 |
| Fumed Silica | 1.83 |
| Titanium Dioxide | 3.04 |
| Calcium Carbonate | 20.99 |
| Mica | 15.06 |
| Polyamide Powder | 14.92 |
| Microspheres | 0.17 |

Separately, the following materials were mixed in the amounts according to Table II to form the curing agent composition: manganese dioxide from Eagle Picher, partially hydrogenated terphenyl, stearic acid, fumed silica, sodium stearate from Witco Chemicals, molecular sieve powder to remove excess moisture from the curing agent, and dipentamethylene/thiuram/polysulfide mixture from Akrochem Corporation to accelerate the cure.

TABLE II

Curing Agent Composition

| | Weight Percent |
|---|---|
| Manganese Dioxide | 54.59 |
| Partially Hydrogenated Terphenyl | 35.92 |
| Stearic Acid | 0.60 |
| Fumed Silica | 2.00 |
| Sodium Stearate | 0.73 |
| Molecular Sieve Powder | 0.70 |
| Dipentamethylene/Thiuram/Polysulfide Mixture | 5.46 |

One hundred parts by weight of base composition and 10 parts by weight of curing agent composition were mixed to prepare the preformed composition. After mixing, the preformed composition was extruded into a tape form and refrigerated at −40° C.

The surface adjacent to the perimeter of an access panel was first coated with low VOC epoxy primer according to specification MMS-423 and cured. The surface was cleaned and then coated with adhesion promoters PR-148® or PR-184® from PRC-DeSoto International, Inc. The access panel was made from AMS-T-9046 titanium alloy. After the refrigerated preformed composition equilibrated to use temperature, 4° C. to 32° C. (40° F. to 90° F.), the preformed composition in tape form was manually applied to the surface adjacent to the perimeter of the access panel. The access panel was put in place to cover the access opening and clamped down, forcing the excess preformed composition around the edges of the access panel to fill the aperture. Excess preformed composition was easily removed. After 3 to 4 hours at a temperature of 4° C. to 32° C. (40° F. to 90° F.), a tight seal, resistant to moisture and aircraft fuel, resulted.

The preformed composition as described above was also applied to an access panel made from aluminum that was treated with a conversion coating meeting specification MIL-C-5541 and then coated with fuel tank coating meeting specification AMS-C-27725. After 3 to 4 hours at a temperature of 4° C. to 32° C. (40° F. to 90° F.), a tight seal, resistant to moisture and aircraft fuel, resulted.

EXAMPLE 2

In another example, a polythioether polymer, Permapol P-3.1e® from PRC-DeSoto International, Inc., Glendale, Calif., Bisphenol-A epoxy resin, and triethylene diamine were combined in the proportions according to Table III to form a thiol-terminated polymer adduct.

TABLE III

Polymer Adduct

| | Weight Percent |
|---|---|
| Permapol P-3.1e ® | 95.01 |
| Bisphenol A Epoxy Resin | 4.75 |
| Triethylene Diamine | 0.24 |

The compounds in Table III were blended and heated to 71° C. (160° F.) and mixed at 71° C. for one hour. The mixture was then heated for 14 to 24 hours at 60° C. (140° F.) without mixing to form a thiol-terminated polymer adduct. Thiol-terminated polymer adduct, triethylenediamine, partially hydrogenated terphenyl, titanium dioxide, calcium carbonate, mica, polyamide powder, and microspheres were mixed in the proportions according to Table IV to form the base composition.

TABLE IV

Base Composition

| | Weight Percent |
|---|---|
| Thiol-Terminated Polymer Adduct | 37.42 |
| Triethylenediamine | 0.47 |
| Partially Hydrogenated Terphenyl | 1.40 |
| Titanium Dioxide | 3.56 |
| Calcium Carbonate | 21.54 |
| Mica | 17.80 |
| Polyamide Powder | 17.64 |
| Microspheres | 0.17 |

The curing agent composition was formed by mixing liquid epoxy resin from Shell Chemical, partially hydrogenated terphenyl, carbon black from Cabot Corporation, fumed silica, calcium carbonate, mica, polyamide powder, and microspheres in the proportions according to Table V.

TABLE V

Curing Agent Composition

| | Weight Percent |
|---|---|
| Liquid Epoxy Resin | 33.39 |
| Partially Hydrogenated Terphenyl | 4.00 |
| Carbon Black | 0.17 |
| Fumed Silica | 0.67 |
| Calcium Carbonate | 30.05 |
| Mica | 20.03 |
| Polyamide Powder | 11.69 |

In one embodiment, 100 parts by weight of base composition and 10.9 parts by weight of curing agent composition were mixed to prepare a preformed composition with an epoxy-to-thiol ratio of 1.53:1. In another embodiment, a mix ratio of 100 parts by weight of base composition and 11.67 parts by weight of curing agent composition were mixed to prepare a preformed composition with an epoxy-to-thiol ratio of 1.64:1. In both embodiments, the preformed composition was subsequently extruded into a tape form and refrigerated to −62° C. After equilibrating to use temperature, the preformed compositions were applied to the surfaces adjacent to the perimeter of access panels as described in Example 1. After 3 to 4 hours at a temperature of 4° C. to 32° C. (40° F. to 90° F.), tight seals, resistant to moisture and aircraft fuel, resulted.

EXAMPLE 3

In Example 3, four additional base compositions using different amounts of the components of Example 1 were prepared according to Table VI.

TABLE VI

| Base Compositions | | | | |
|---|---|---|---|---|
| | Weight Percent | Weight Percent | Weight Percent | Weight Percent |
| Polysulfide Polymer | 38.10 | 35.86 | 34.89 | 30.99 |
| 2-mercaptoethanol | 0.10 | 0.09 | 0.09 | 0.08 |
| Partially Hydrogenated Terphenyl | 6.53 | 6.15 | 5.95 | 5.90 |
| Phenolic Resin | 1.09 | 1.03 | 0.90 | 0.85 |
| Fumed Silica | 1.91 | 1.79 | 1.73 | 1.63 |
| Titanium Dioxide | 3.16 | 2.98 | 2.88 | 2.78 |
| Calcium Carbonate | 17.59 | 20.58 | 19.76 | 18.65 |
| Mica | 16.65 | 15.76 | 16.82 | 19.48 |
| Polyamide Powder | 14.69 | 15.60 | 16.82 | 19.48 |
| Microspheres | 0.18 | 0.16 | 0.16 | 0.16 |

The base compositions of Table VI were independently mixed with the curing agent composition of Example 1. As in Example 1, 100 parts by weight of the base composition was mixed with 10 parts by weight of the curing agent composition to prepare the preformed composition. The preformed composition was extruded in tape form, refrigerated, equilibrated to use temperature and applied to an access panel as described in Example 1. After 3 to 4 hours at a temperature of 4° C. to 32° C. (40° F. to 90° F.) a tight seal, resistant to moisture and aircraft fuel, resulted.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A preformed composition in shaped form comprising a sulfur-containing polymer, and a blend of fillers wherein the blend of fillers comprises substantially equal amounts of mica and polyamide.

2. The preformed composition of claim 1 wherein the blend of fillers is present in an amount ranging from 10% by weight to 50% by weight of the total weight of the preformed composition.

3. The preformed composition of claim 1 wherein the blend of fillers is present in an amount ranging from 15% by weight to 45% by weight of the total weight of the preformed composition.

4. The preformed composition of claim 1 wherein the blend of fillers comprises an amount of mica ranging from 5% by weight to 25% by weight of the total weight of the preformed composition, and an amount of polyamide ranging from 5% by weight to 25% by weight of the total weight of the preformed composition.

5. The preformed composition of claim 1 wherein the blend of fillers comprises an amount of mica ranging from 10% by weight to 20% by weight of the total weight of the preformed composition, and an amount of polyamide ranging from 10% by weight to 20% by weight of the total weight of the preformed composition.

6. The preformed composition of claim 1 further comprising a plasticizer.

7. A method for sealing an aperture comprising
preparing a preformed composition comprising a curable sulfur-containing polymer in shaped form, wherein the average number molecular weight of the sulfur-containing polymer ranges from 500 to 8,000 Daltons;
refrigerating the preformed composition;
equilibrating the preformed composition to a temperature ranging from 4° C. to 32° C.; and
applying the thermally eciuilibrated preformed composition to a surface to seal an aperture.

8. The method of claim 7 wherein the sulfur-containing polymer is a polysulfide polymer.

9. The method of claim 7 wherein the sulfur-containing polymer is a mercapto-terminated polymer.

10. The method of claim 7 wherein the surface is a surface of a removable panel.

11. The method of claim 10 further comprising positioning the removable panel against a surface adjacent to an opening.

12. The method of claim 7 wherein the surface is a surface adjacent to an opening.

13. The method of claim 12 further comprising positioning a removable panel against the surface adjacent to the opening.

14. The method of claim 7 wherein the aperture is a space between the surface adjacent to an opening and the surface of a removable panel.

15. The method of claim 7 wherein the aperture is on an aircraft.

16. The method of claim 7 wherein an adhesion promoter is applied to at least one surface defining the aperture prior to application of the preformed composition.

17. The method of claim 7 wherein a release agent is applied to a least one surface defining the aperture prior to application of the preformed composition.

18. A composition comprising:
(a) a sulfur-containing polymer, and
(b) a blend of fillers, wherein the blend comprises substantially equal amounts of mica and polyamide.

19. The composition of claim 18 wherein the sulfur-containing polymer is a polysulfide polymer.

20. The composition of claim 18 wherein the sulfur-containing polymer is a mercapto-terminated polymer.

21. The composition of claim 18 further comprising a curing agent for the sulfur-containing polymer.

22. The composition of claim 21 wherein the curing agent is selected from manganese dioxide and polyepoxide.

23. The composition of claim 21 wherein the curing agent is reactive at a temperature ranging from 10° C. to 80° C.

24. The composition of claim 21 wherein the curing agent is present in an amount ranging from 5% by weight to 20% by weight of the total weight of the composition.

25. The composition of claim 18 wherein the sulfur-containing polymer is present in an amount ranging from 20% by weight to 50% by weight of the total weight of the composition.

26. The composition of claim 18 wherein the mica and polyamide are present in a combined amount ranging from 10% by weight to 50% by weight of the total weight of the composition.

27. The composition of claim 18 wherein the mica and polyamide are present in a combined amount ranging from 15% by weight to 45% by weight of the total weight of the composition.

28. The composition of claim 18 wherein the blend of fillers comprises an amount of mica ranging from 5% by weight to 25% by weight of the total weight of the composition, and an amount of polyamide ranging from 5% by weight to 25% by weight of the total weight of the composition.

29. The composition of claim 18 wherein the blend of fillers comprises an amount of mica ranging from 10% by weight to 20% by weight of the total weight of the composition, and an amount of polyamide ranging from 10% by weight to 20% by weight of the total weight of the composition.

30. The composition of claim 18 wherein the composition further comprises a phenolic resin.

31. The composition of claim 30 wherein the phenolic resin is present in an amount ranging from 0.1% by weight to 10% by weight of the total weight of the composition.

32. The composition of claim 18, wherein the blend of fillers further comprises a filler selected from calcium carbonate, fumed silica, microspheres, titanium oxide, and combinations thereof.

33. The composition of claim 32 wherein the filler is present in an amount ranging from 10% by weight to 50% by weight of the total weight of the composition.

34. The composition of claim 18 further comprising a plasticizer.

35. The method of claim 7 wherein a tight seal, resistant to moisture and aircraft fuel as determined by Military Material Specification 332 is formed after 3 to 4 hours at a temperature of 4° C. to 32° C.

36. The method of claim 7 wherein the preformed composition is refrigerated at a temperature of −40° C. or less.

* * * * *